US012315455B2

(12) United States Patent
Wei et al.

(10) Patent No.: US 12,315,455 B2
(45) Date of Patent: May 27, 2025

(54) DISPLAY APPARATUS AND PIXEL CIRCUIT

(71) Applicants: Chongqing BOE Display Technology Co., Ltd., Chongqing (CN); BOE Technology Group Co., Ltd., Beijing (CN)

(72) Inventors: Xinyu Wei, Beijing (CN); Xuebin Yuan, Beijing (CN); Gang Wang, Beijing (CN); Qiang Fu, Beijing (CN)

(73) Assignees: Chongqing BOE Display Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/294,535

(22) PCT Filed: Mar. 31, 2023

(86) PCT No.: PCT/CN2023/085506
§ 371 (c)(1),
(2) Date: Feb. 1, 2024

(87) PCT Pub. No.: WO2024/197824
PCT Pub. Date: Oct. 3, 2024

(65) Prior Publication Data

US 2025/0104638 A1 Mar. 27, 2025

(51) Int. Cl.
*G09G 3/3258* (2016.01)

(52) U.S. Cl.
CPC ... *G09G 3/3258* (2013.01); *G09G 2300/0819* (2013.01); *G09G 2300/0852* (2013.01);
(Continued)

(58) Field of Classification Search
CPC ......... G09G 3/3258; G09G 2300/0819; G09G 2300/0852; G09G 2300/0861; G09G 2310/08; G09G 2320/0233
See application file for complete search history.

(56) References Cited

U.S. PATENT DOCUMENTS

2018/0341357 A1* 11/2018 Son ........................ G06F 3/0412
2018/0342193 A1* 11/2018 Shen ........................ G09G 3/20
(Continued)

FOREIGN PATENT DOCUMENTS

CN 111696473 A 9/2020
CN 111696486 A 9/2020
(Continued)

OTHER PUBLICATIONS

PCT/CN2023/085506 international search report dated Dec. 26, 2023.
PCT/CN2023/085506 Written Opinion dated Dec. 26, 2023.

*Primary Examiner* — Sejoon Ahn
(74) *Attorney, Agent, or Firm* — IPro, PLLC

(57) ABSTRACT

A display apparatus and a pixel circuit. The pixel circuit includes: a first storage sub-circuit, connected between a first node and a second node; a data writing sub-circuit, configured to charge the second node; a driving sub-circuit, configured to control connection or disconnection between a third node and a fourth node under control of the first node; a compensation sub-circuit, configured to control connection or disconnection between the first node and the fourth node under control of a first scan signal end; a luminous control sub-circuit, configured to control connection or disconnection between a first power end and the third node under control of a first luminous control signal end, and further configured to control connection or disconnection between the fourth node and a first electrode of a sub-pixel under control of a second luminous control signal. The present disclosure can improve display effect.

15 Claims, 4 Drawing Sheets

(52) U.S. Cl.
CPC . *G09G 2300/0861* (2013.01); *G09G 2310/08* (2013.01); *G09G 2320/0233* (2013.01)

(56) References Cited

U.S. PATENT DOCUMENTS

| | | | | |
|---|---|---|---|---|
| 2018/0342200 | A1* | 11/2018 | Morris | G09G 3/3208 |
| 2018/0342203 | A1* | 11/2018 | Soda | G09G 3/3258 |
| 2018/0342213 | A1* | 11/2018 | Ikeda | G09G 3/3611 |
| 2018/0342570 | A1* | 11/2018 | Hong | H10K 59/131 |
| 2021/0201773 | A1 | 7/2021 | Liu et al. | |
| 2021/0375192 | A1 | 12/2021 | Jeon et al. | |
| 2021/0376041 | A1 | 12/2021 | Lee et al. | |
| 2023/0024280 | A1 | 1/2023 | Yanase et al. | |
| 2023/0042603 | A1 | 2/2023 | Huangfu et al. | |

FOREIGN PATENT DOCUMENTS

| | | | |
|---|---|---|---|
| CN | 112259041 | A | 1/2021 |
| CN | 112509518 | A | 3/2021 |
| CN | 113744676 | A | 12/2021 |
| CN | 113838415 | A | 12/2021 |
| CN | 115101011 | A | 9/2022 |
| CN | 115512656 | A | 12/2022 |
| KR | 20200055580 | A | 5/2020 |

* cited by examiner

DISPLAY APPARATUS AND PIXEL CIRCUIT

CROSS-REFERENCE TO RELATED APPLICATIONS

This application is a national stage of international PCT Application No. PCT/CN2023/085506 filed on Mar. 31, 2023, the entire contents of which are incorporated herein by reference.

TECHNICAL FIELD

The present disclosure relates to the technical field of display, and in particular, to a display apparatus and a pixel circuit.

BACKGROUND

Organic electroluminescent display is a new generation of display products after liquid crystal display. Because of good color saturation, fast response speed, foldability, thinness and other properties, the organic electroluminescent display is gradually becoming a mainstream and leader in the display field. The organic electroluminescent display needs to be further improved.

SUMMARY

A purpose of the present disclosure is to provide a display apparatus and a pixel circuit, which can improve display effect.

According to an aspect of the present disclosure, a pixel circuit is provided, including:

- a first storage sub-circuit, connected between a first node and a second node;
- a data writing sub-circuit, connected to the second node, where the data writing sub-circuit is configured to charge the second node;
- a driving sub-circuit, connected to the first node, a third node and a fourth node, where the driving sub-circuit is configured to control connection or disconnection between the third node and the fourth node under control of the first node;
- a compensation sub-circuit, connected to a first scan signal end, the first node and the fourth node, where the compensation sub-circuit is configured to control connection or disconnection between the first node and the fourth node under control of the first scan signal end; and
- a luminous control sub-circuit, connected to a first power end, a first luminous control signal end, the third node, the fourth node, a second luminous control signal end and a first electrode of a sub-pixel, where the luminous control sub-circuit is configured to control connection or disconnection between the first power end and the third node under control of the first luminous control signal end, and is configured to control connection or disconnection between the fourth node and the first electrode of the sub-pixel under control of the second luminous control signal end.

Further, the pixel circuit further includes:

- a first reset sub-circuit, connected to a second scan signal end, a first reference voltage end and the second node, where the first reset sub-circuit is configured to control connection or disconnection between the first reference voltage end and the second node under control of the second scan signal end.

Further, the first reset sub-circuit includes:

- a first reset transistor, where a control electrode of the first reset transistor is connected to the second scan signal end, a first electrode of the first reset transistor is connected to the first reference voltage end, and a second electrode of the first reset transistor is connected to the second node.

Further, within a frame, a start time that the first reset sub-circuit controls the first reference voltage end to connect to the second node is before a start time that the compensation sub-circuit controls the first node to connect to the fourth node.

Further, the pixel circuit further includes:

- a second reset sub-circuit, connected to a first reset signal end, a first initialization signal end and the first node, where the second reset sub-circuit is configured to control connection or disconnection between the first initialization signal end and the first node under control of the first reset signal end;
- a third reset sub-circuit, connected to a second reset signal end, a second reference voltage end and the third node, where the third reset sub-circuit is configured to control connection or disconnection between the second reference voltage end and the third node under control of the second reset signal end.

Further, the second reset sub-circuit includes:

- a second reset transistor, where a control electrode of the second reset transistor is connected to the first reset signal end, a first electrode of the second reset transistor is connected to the first initialization signal end, and a second electrode of the second reset transistor is connected to the first node; and the third reset sub-circuit includes:

- a third reset transistor, where a control electrode of the third reset transistor is connected to the second reset signal end, a first electrode of the third reset transistor is connected to the second reference voltage end, and a second electrode of the third reset transistor is connected to the third node.

Further, the pixel circuit further includes:

- a fourth reset sub-circuit, connected to a second reset signal end, a second initialization signal end and the first electrode of the sub-pixel, where the fourth reset sub-circuit is configured to control connection or disconnection between the second initialization signal end and the first electrode of the sub-pixel under control of the second reset signal end; and the fourth reset sub-circuit includes:

- a fourth reset transistor, where a control electrode of the fourth reset transistor is connected to the second reset signal end, a first electrode of the fourth reset transistor is connected to the second initialization signal end, and a second electrode of the fourth reset transistor is connected to the first electrode of the sub-pixel.

Further, the data writing sub-circuit includes:

- a data writing transistor, where a control electrode of the data writing transistor is connected to a third scan signal end, a first electrode of the data writing transistor is connected to a data signal end, and a second electrode of the data writing transistor is connected to the second node.

Further, the driving sub-circuit includes:

- a driving transistor, where a control electrode of the driving transistor is connected to the first node, a first electrode of the driving transistor is connected to the third node, and a second electrode of the driving transistor is connected to the fourth node; and the compensation sub-circuit includes:

a compensation transistor, where a control electrode of the compensation transistor is connected to the first scan signal end, a first electrode of the compensation transistor is connected to the fourth node, and a second electrode of the compensation transistor is connected to the first node.

Further, the luminous control sub-circuit includes:

a first luminous control transistor, where a control electrode of the first luminous control transistor is connected to the first luminous control signal end, a first electrode of the first luminous control transistor is connected to the first power end, and a second electrode of the first luminous control transistor is connected to the third node;

a second luminous control transistor, where a control electrode of the second luminous control transistor is connected to the second luminous control signal end, a first electrode of the second luminous control transistor is connected to the fourth node, and a second electrode of the second luminous control transistor is connected to the first electrode of the sub-pixel.

Further, the data writing transistor, the first reset transistor, the second reset transistor and the compensation transistor are oxide thin-film transistors; the first luminous control transistor, the third reset transistor, the driving transistor, the second luminous control transistor and the fourth reset transistor are low-temperature polysilicon thin-film transistors.

Further, the pixel circuit is applied to a display apparatus, the display apparatus includes a plurality of sub-pixels arranged in an array, the plurality of sub-pixels constitute a plurality of sub-pixel rows, the plurality of sub-pixel rows constitute one or more pixel groups, and each of the one or more pixel groups includes multiple sub-pixel rows;

pixel circuits correspondingly connected to sub-pixels in a pixel group are connected to a same first scan signal end; and/or pixel circuits correspondingly connected to sub-pixels in a pixel group are connected to a same second scan signal end; and/or pixel circuits correspondingly connected to sub-pixels in a pixel group are connected to a same first reset signal end; and/or pixel circuits correspondingly connected to sub-pixels in a pixel group are connected to a same second reset signal end; and/or pixel circuits correspondingly connected to sub-pixels in a pixel group are connected to a same first luminous control signal end; and/or pixel circuits correspondingly connected to sub-pixels in a pixel group are connected to a same second luminous control signal end.

Further, within a frame, a driving process of the pixel circuit includes a compensation stage, a data writing stage and a display stage, where the compensation stage is before the data writing stage, and the display stage is after the data writing stage;

within a frame, for sub-pixel rows in a pixel group, a time interval between a start time that the data writing sub-circuit in the pixel circuit connected to a first one of the sub-pixel rows charges the second node and an end time of the compensation stage is greater than a charging duration that the data writing sub-circuit charges the second node; and/or, within a frame, for sub-pixels rows in a pixel group, a time interval between an end time that the data writing sub-circuit in the pixel circuit connected to a last one of the sub-pixel rows charges the second node and a start time of the display stage is greater than a charging duration that the data writing sub-circuit charges the second node.

According to an aspect of the present disclosure, a display apparatus is provided, including the pixel circuit and the sub-pixel connected to the pixel circuit.

According to the display apparatus and the pixel circuit, during a driving process, a driving sub-circuit is caused to control connection between a third node and a fourth node, a compensation sub-circuit is caused to control connection between a first node and the fourth node, a luminous control sub-circuit is caused to control connection between a first power end and the third node, so that the first node can be charged through the first power end, and a threshold voltage can be compensated to the driving sub-circuit, so that a problem of poor display effect caused by different threshold voltages can be solved, thereby improving display effect.

Figure 1:
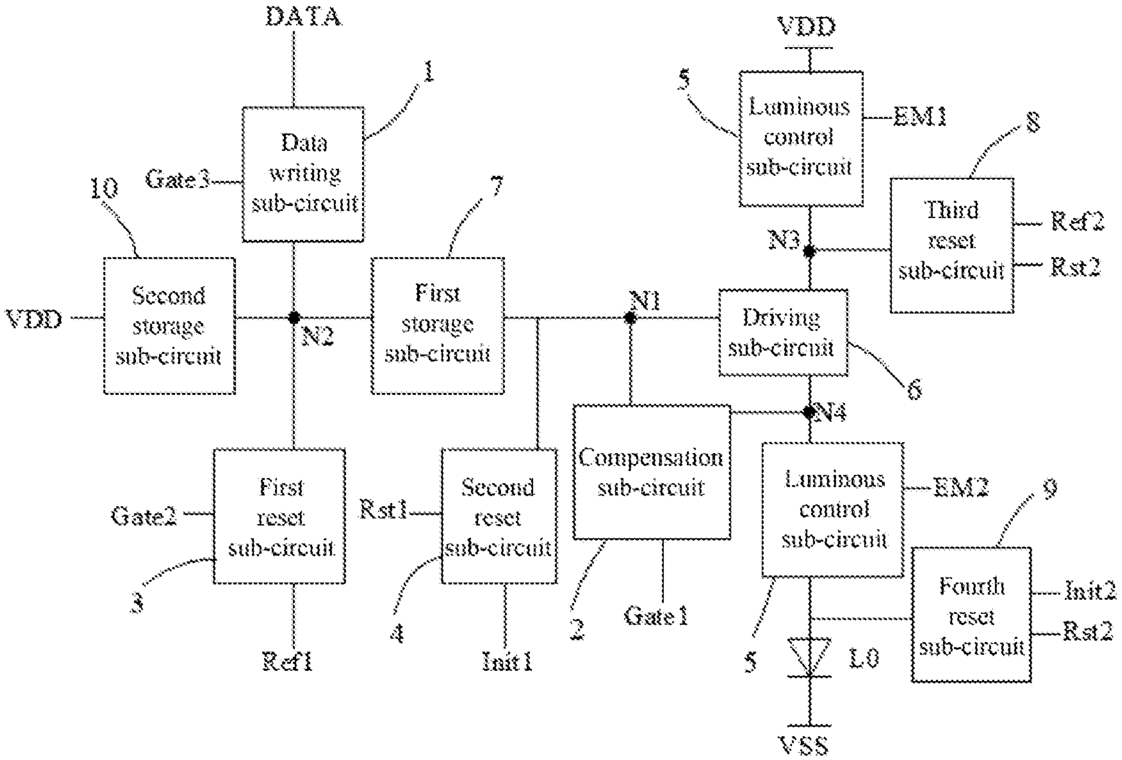
FIG. 1 is a block diagram of a pixel circuit of an embodiment of the present disclosure.

Reference numerals: 1, data writing sub-circuit; 2, compensation sub-circuit; 3, first reset sub-circuit; 4, second reset sub-circuit; 5, luminous control sub-circuit; 6, driving sub-circuit; 7, first storage sub-circuit; 8, third reset sub-circuit; 9, fourth reset sub-circuit; 10, second storage sub-circuit; 11, sub-pixel row; 12, sub-pixel column; EM1, first luminous control signal end; EM2, second luminous control signal end; Rst1, first reset signal end; Rst2, second reset signal end; Gate1, first scan signal end; Gate2, second scan signal end; Gate3, third scan signal end; Init1, first initialization signal end; Init2, second initialization signal end; Ref1, first reference voltage end; Ref2, second reference voltage end; VDD, first power end; C1, first capacitor; C2, second capacitor; L0, sub-pixel; T1, data writing transistor; T2, compensation transistor; T3, driving transistor; T4 second luminous control transistor; T5, first luminous control transistor; T6 second reset transistor; T7, first reset transistor; T8, fourth reset transistor; T9, third reset transistor.

DETAILED DESCRIPTION

Description will now be made in detail to illustrative embodiments, examples of which are shown in the accompanying drawings. When the following description refers to the drawings, unless otherwise indicated, same reference numerals in different drawings indicate the same or similar elements. Embodiments described in the following illustrative embodiments do not represent all embodiments consistent with the present disclosure. In contrary, they are merely examples of apparatuses consistent with some aspects of the present disclosure as described in detail in the appended claims.

The terminologies used in the present disclosure are for the purpose of describing specific embodiments only and are not intended to limit the present disclosure. Unless otherwise defined, technical terms or scientific terms used in the present disclosure shall have their ordinary meanings as understood by those of ordinary skills in the field to which the present disclosure belongs. The "first", "second" and similar words used in the specification and claims of the present disclosure do not indicate any order, quantity or importance, but are only used to distinguish different components. Similarly, similar words such as "a" or "an" do not mean quantity limitation, but mean that there is at least one. "Multiple" or "a plurality of" means two or more. Unless otherwise specified, similar words such as "front", "rear" "lower" and/or "upper" are only for convenience of explanation, and are not limited to a position or a spatial orientation. Similar words such as "include" or "comprise" mean that the elements or objects appear before "include" or "comprise" cover the elements or objects listed after "include" or "comprise" and their equivalents, but do not exclude other elements or objects. When describing some embodiments, expressions of "connection" and "couple" and their derivations may be used. For example, when describing some embodiments, the term "connection" may be used to indicate that two or more components are in direct physical contact or electrical contact with each other. For another example, when describing some embodiments, the term "couple" may be used to indicate that two or more components are in direct physical contact or electrical contact. However, the term "connection" may also indicate that two or more components are not in direct contact with each other, but still cooperate or interact with each other. Singular forms "a", "the" and "said" used in the specification of the present disclosure and the appended claims are also intended to include plural forms, unless the context clearly indicates other meaning. It should also be understood that the term "and/or" as used herein refers to and includes any or all possible combinations of one or more associated listed items.

The transistors used in the present disclosure can all be triodes, thin film transistors or field effect transistors or other components with same characteristics. In the embodiments of the present disclosure, in order to distinguish two electrodes of a transistor except for a control electrode, one of them is referred to as a first electrode and the other is referred to as a second electrode.

In practical operations, when the transistor is a triode, the control electrode can be a base, the first electrode can be a collector, and the second electrode can be an emitter; or, the control electrode can be a base, the first electrode can be an emitter, and the second electrode can be a collector.

In practical operations, when the transistor is a thin-film transistor or a field effect transistor, the control electrode can be a gate, the first electrode can be a drain and the second electrode can be a source; or, the control electrode can be a gate, the first electrode can be a source and the second electrode can be a drain.

Figure 5:
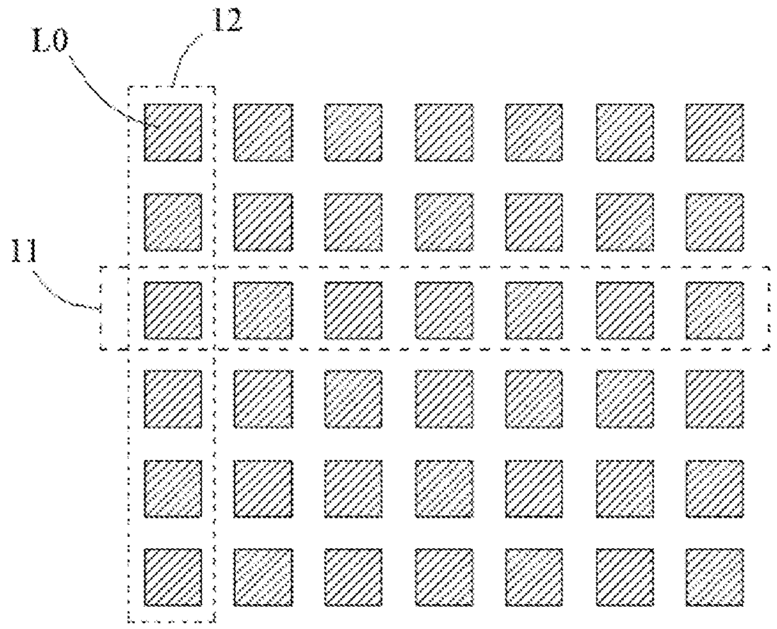
FIG. 5 is a schematic arrangement diagram of sub-pixels of an embodiment of the present disclosure.

An embodiment of the present disclosure provides a pixel circuit. The pixel circuit is applied to a display apparatus. As shown in FIG. 5, the display apparatus may include a plurality of sub-pixels L0 and a plurality of pixel circuits, where the plurality of pixel circuits drive the plurality of sub-pixels L0 to emit light in a one-to-one correspondence. The plurality of sub-pixels L0 include first sub-pixels, second sub-pixels and third sub-pixels. The first sub-pixels, the second sub-pixels and the third sub-pixels have different luminous colors. For example, the first sub-pixels emit red light, the second sub-pixels emit green light, and the third sub-pixels emit blue light. The above-mentioned plurality of sub-pixels L0 can be distributed in an array, and constitute a plurality of sub-pixel rows 11 and a plurality of sub-pixel columns 12. A sub-pixel row 11 includes a plurality of sub-pixels L0 distributed along a row direction, and a sub-pixel column 12 includes a plurality of sub-pixels L0 distributed along a column direction. A first sub-pixel, a second sub-pixel and a third sub-pixel can form a pixel. The plurality of sub-pixels L0 may form a plurality of pixels.

As shown in FIG. 1, the pixel circuit may include a first storage sub-circuit 7, a data writing sub-circuit 1, a driving sub-circuit 6, a compensation sub-circuit 2 and a luminous control sub-circuit 5.

The first storage sub-circuit 7 is connected between a first node N1 and a second node N2. The data writing sub-circuit 1 is connected to the second node N2, and is configured to charge the second node N2. The driving sub-circuit 6 is connected to the first node N1, a third node N3 and a fourth node N4, and is configured to control connection or disconnection between the third node N3 and the fourth node N4 under control of the first node N1. The compensation sub-circuit 2 is connected to a first scan signal end Gate1, the first node N1 and the fourth node N4, and is configured to control connection or disconnection between the first node N1 and the fourth node N4 under control of the first scan signal end Gate1. The luminous control sub-circuit 5 is connected to a first power end VDD, a first luminous control signal end EM1, the third node N3, the fourth node N4, a second luminous control signal end EM2 and a first electrode of a sub-pixel L0, and is configured to control connection or disconnection between the first power end VDD and the third node N3 under control of the first luminous control signal end EM1, and is configured to control connection or disconnection between the fourth node N4 and the first electrode of the sub-pixel L0 under control of the second luminous control signal end EM2.

According to the pixel circuit of the embodiment of the present disclosure, during a driving process, a driving sub-circuit 6 is caused to control connection between a third node N3 and a fourth node N4, a compensation sub-circuit 5 is caused to control connection between a first node N1 and the fourth node N4, a luminous control sub-circuit 5 is caused to control connection between a first power end VDD and the third node N3, so that the first node N1 can be charged through the first power end VDD, and a threshold voltage can be compensated to the driving sub-circuit 6, so that a problem of poor display effect caused by different threshold voltages can be solved, thereby improving display effect; at the same time, the threshold voltage compensation of the present disclosure is not influenced by writing time of a data signal, and compensation effect can be improved by adding a compensation time.

Respective parts of the pixel circuit according to the embodiment of the present disclosure will be described in detail below.

Figure 2:
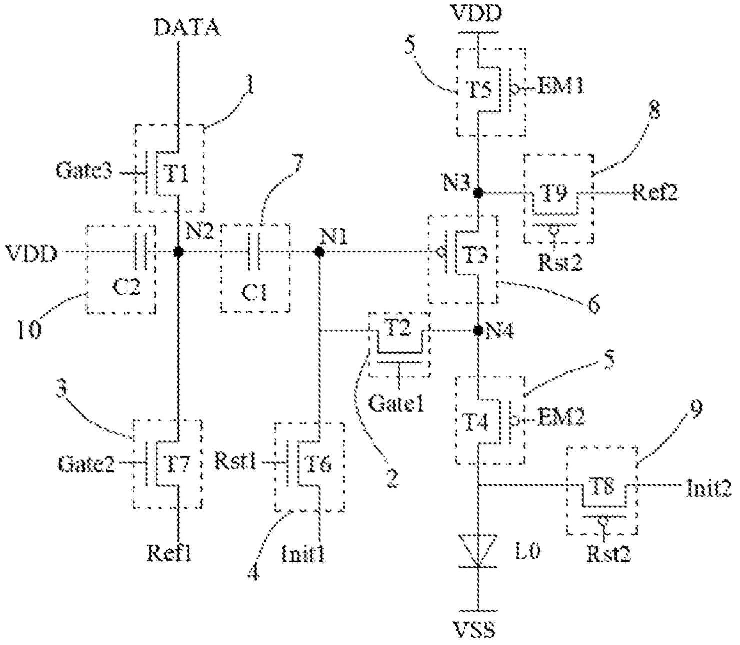
FIG. 2 is a circuit diagram of a pixel circuit of an embodiment of the present disclosure.

As shown in FIG. 1 and FIG. 2, the data writing sub-circuit 1 is connected to the second node N2, and is configured to charge the second node N2. Specifically, the data writing sub-circuit 1 can be connected to a data signal end DATA, a third scan signal end Gate 3 and the second node N2, and is configured to control connection or disconnection between the data signal end DATA and the second node N2 under control of the third scan signal end Gate 3. For example, the data writing sub-circuit 1 can include a data writing transistor T1. A control electrode of the data writing transistor T1 is connected to the third scan signal end Gate 3, a first electrode of the data writing transistor T1 is connected to the data signal end DATA, and a second electrode of the data writing transistor T1 is connected to the second node N2. The data writing transistor T1 can be an oxide thin-film transistor, or certainly, can be a low-temperature polysilicon thin-film transistor.

As shown in FIG. 1 and FIG. 2, the first storage sub-circuit 7 is connected between the first node N1 and the second node N2. For example, the first storage sub-circuit 7 includes a first capacitor C1, a first electrode of the first capacitor C1 is connected to the first node N1, and a second electrode of the first capacitor C1 is connected to the second node N2.

As shown in FIG. 1 and FIG. 2, the driving sub-circuit 6 is connected to the first node N1, the third node N3 and the fourth node N4, and is configured to control connection or disconnection between the third node N3 and the fourth node N4 under control of the first node N1. For example, the driving sub-circuit 6 can include a driving transistor T3. A control electrode of the driving transistor T3 is connected to the first node N1, a first electrode of the driving transistor T3 is connected to the third node N3, and a second electrode of the driving transistor T3 is connected to the fourth node N4. The driving transistor T3 can be an oxide thin-film transistor, or certainly, can be a low-temperature polysilicon thin-film transistor.

As shown in FIG. 1 and FIG. 2, the compensation sub-circuit 2 is connected to a first scan signal end Gate1, the first node N1 and the fourth node N4, and is configured to control connection or disconnection between the first node N1 and the fourth node N4 under control of the first scan signal end Gate1. For example, the compensation sub-circuit 2 can include a compensation transistor T2. A control electrode of the compensation transistor T2 is connected to the first scan signal end Gate1, a first electrode of the compensation transistor T2 is connected to the fourth node N4, and a second electrode of the compensation transistor T2 is connected to the first node N1. The compensation transistor T2 can be an oxide thin-film transistor, or certainly, can be a low-temperature polysilicon thin-film transistor. A plurality of pixel circuits connected to the plurality of sub-pixels L0 in a sub-pixel row 11 in a one-to-one correspondence can be connected to a same first scan signal end Gate1, that is, compensation sub-circuits 2 of the plurality of pixel circuits connected to the plurality of sub-pixels L0 in the sub-pixel row 11 in a one-to-one correspondence can be connected to the same first scan signal end Gate1. The plurality of sub-pixel rows 11 constitute one or more pixel groups. One pixel group can include a plurality of sub-pixel rows 11, for example, two sub-pixel rows 11, three sub-pixel rows 11, or fourth sub-pixel rows 11, etc. A number of sub-pixel rows 11 in different pixel groups is the same. A plurality of pixel circuits correspondingly connected to sub-pixels L0 in a pixel group are connected to a same first scan signal end Gate1.

As shown in FIG. 1 and FIG. 2, the luminous control sub-circuit 5 is connected to a first power end VDD, a first luminous control signal end EM1, the third node N3, the fourth node N4, a second luminous control signal end EM2 and a first electrode of a sub-pixel L0, and is configured to control connection or disconnection between the first power end VDD and the third node N3 under control of the first luminous control signal end EM1, and is configured to control connection or disconnection between the fourth node N4 and the first electrode of the sub-pixel L0 under control of the second luminous control signal end EM2. For example, the luminous control sub-circuit 5 can include a first luminous control transistor T5 and a second luminous control transistor T4. A control electrode of the first luminous control transistor T5 is connected to the first luminous control signal end EM1, a first electrode of the first luminous control transistor T5 is connected to the first power end VDD, and a second electrode of the first luminous control transistor T5 is connected to the third node N3. The first luminous control transistor T5 can be an oxide thin-film transistor, or certainly, can be a low-temperature polysilicon thin-film transistor. A control electrode of the second luminous control transistor T4 is connected to the second luminous control signal end EM2, a first electrode of the second luminous control transistor T4 is connected to the fourth node N4, and a second electrode of the second luminous control transistor T4 is connected to the first electrode of the sub-pixel L0. A second electrode of the sub-pixel L0 can be connected to a second power end VSS. The second luminous control transistor T4 can be an oxide thin-film transistor, or certainly, can be a low-temperature polysilicon thin-film transistor. In addition, a plurality of pixel circuits correspondingly connected to sub-pixels L0 in a pixel group are connected to a same first luminous control signal end EM1. A plurality of pixel circuits correspondingly connected to sub-pixels L0 in a pixel group are connected to a same second luminous control signal end EM2.

Figure 3A:
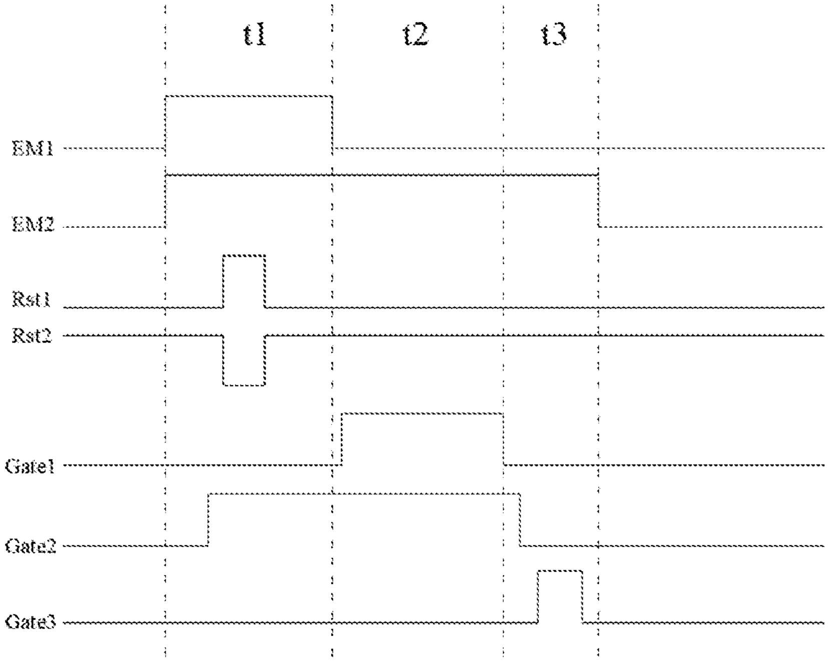
FIG. 3A, FIG. 3B and FIG. 3C are operating timing diagrams of the pixel circuit shown in FIG. 2.

As shown in FIG. 1 and FIG. 2, the pixel circuit of the present disclosure may further include a first reset sub-circuit 3. The first reset sub-circuit 3 can be connected to a second scan signal end Gate2, a first reference voltage end Ref1 and the second node N2, and can be configured to control connection or disconnection between the first reference voltage end Ref1 and the second node N2 under control of the second scan signal end Gate2. For example, the first reset sub-circuit 3 can include a first reset transistor T7. A control electrode of the first reset transistor T7 is connected to the second scan signal end Gate2, a first electrode of the first reset transistor T7 is connected to the first reference voltage end Ref1, and a second electrode of the first reset transistor T7 is connected to the second node N2. The first reset transistor T7 can be an oxide thin-film transistor, or certainly, can be a low-temperature polysilicon thin-film transistor. As shown in FIG. 3A, within a frame, a time period that the first reset sub-circuit 3 controls the first reference voltage end Ref1 to connect to the second node N2 (i.e., a time period that the second scan signal end Gate2 being high as shown in the figure) is before that the data writing sub-circuit 1 charges the second node N2, which can ensure that an electric potential of the second node N2 within a data writing stage t3 within a current frame is not influenced by a data signal written into the second node N2 by the data signal end DATA in a previous frame. In addition, within a frame, a start time that the first reset sub-circuit 3 controls the first reference voltage end Ref1 to connect to the second node N2 (i.e., a time that the second scan signal end Gate2 jumps from low to high as shown in the figure) is before a start time that the compensation sub-circuit 2 controls the first node N1 to connect to the fourth node N4 (i.e., a time that the first scan signal end Gate1 jumps from low to high as shown in the figure). In such way, it is ensured that an electric potential of the second node N2 within a compensation stage t2 within a current frame is not influenced by a data signal written into the second node N2 by the data signal end DATA in a previous frame. In addition, a plurality of pixel circuits correspondingly connected to sub-pixels L0 in a pixel group are connected to a same second scan signal end Gate2.

As shown in FIG. 1 and FIG. 2, the pixel circuit of the present disclosure may further include a second reset sub-circuit 4. The second reset sub-circuit 4 can be connected to a first reset signal end Rst1, a first initialization signal end Init1 and the first node N1, and is configured to control connection or disconnection between the first initialization signal end Init1 and the first node N1 under control of the first reset signal end Rst1. For example, the second reset sub-circuit 4 can include a second reset transistor T6. A control electrode of the second reset transistor T6 is connected to the first reset signal end Rst1, a first electrode of the second reset transistor T6 is connected to the first initialization signal end Init1, and a second electrode of the second reset transistor T6 is connected to the first node N1. The second reset transistor T6 can be an oxide thin-film transistor, or certainly, can be a low-temperature polysilicon thin-film transistor. In addition, a plurality of pixel circuits correspondingly connected to sub-pixels L0 in a pixel group are connected to a same first reset signal end Rst1.

As shown in FIG. 1 and FIG. 2, the pixel circuit of the present disclosure may further include a third reset sub-circuit 8. The third reset sub-circuit 8 can be connected to a second reset signal end Rst2, a second reference voltage end Ref2 and the third node N3, and can be configured to control connection or disconnection between the second reference voltage end Ref2 and the third node N3 under control of the second reset signal end Rst2. For example, the third reset sub-circuit 8 can include a third reset transistor T9. A control electrode of the third reset transistor T9 is connected to the second reset signal end Rst2, a first electrode of the third reset transistor T9 is connected to the second reference voltage end Ref2, and a second electrode of the third reset transistor T9 is connected to the third node N3. The third reset transistor T9 can be an oxide thin-film transistor, or certainly, can be a low-temperature polysilicon thin-film transistor. In addition, a plurality of pixel circuits correspondingly connected to sub-pixels L0 in a pixel group are connected to a same second reset signal end Rst2.

As shown in FIG. 1 and FIG. 2, the pixel circuit of the present disclosure may further include a fourth reset sub-circuit 9. The fourth reset sub-circuit 9 can be connected to the second reset signal end Rst2, a second initialization signal end Init2 and the first electrode of the sub-pixel L0, and is configured to control connection or disconnection between the second initialization signal end Init2 and the first electrode of the sub-pixel L0 under control of the second reset signal end Rst2. For example, the fourth reset sub-circuit 9 can include a fourth reset transistor T8. A control electrode of the fourth reset transistor T8 is connected to the second reset signal end Rst2, a first electrode of the fourth reset transistor T8 is connected to the second initialization signal end Init2, and a second electrode of the fourth reset transistor T8 is connected to the first electrode of the sub-pixel L0. The fourth reset transistor T8 can be an oxide thin-film transistor, or certainly, can be a low-temperature polysilicon thin-film transistor.

As shown in FIG. 1 and FIG. 2, the pixel circuit of the present disclosure may further include a second storage sub-circuit 10. The second storage sub-circuit 10 is connected between the first power end VDD and the second node N2. For example, the second storage sub-circuit 10 can include a second capacitor C2, where a first electrode of the second capacitor C2 is connected to the second node N2, and a second electrode of the second capacitor C2 is connected to the first power end VDD.

As shown in FIG. 1, FIG. 2 and FIG. 3A, within a frame, a driving process of the pixel circuit includes a compensation stage t2, a data writing stage t3 and a display stage t4, where the compensation stage t2 is before the data writing stage t3, and the display stage t4 is after the data writing stage t3. In the compensation stage t2, the luminous control sub-circuit 5 controls the first power end VDD to connect to the third node N3, the compensation sub-circuit 2 controls the first node N1 to connect to the fourth node N4, that is, the first power end VDD is connected to the third node N3 through the first luminous control transistor T5, the first node N1 is connected to the fourth node N4 through the compensation transistor T2. In the data writing stage t3, the data writing sub-circuit 1 charges the second node N2, that is, the data signal end DATA is connected to the second node N2 through the data writing transistor T1. In the display stage t4, the luminous control sub-circuit 5 controls the first power end VDD to connect to the third node N3, the luminous control sub-circuit 5 further controls the fourth node N4 to connect to the first electrode of the sub-pixel L0, that is, the first power end VDD is connected to the third node N3 through the first luminous control transistor T5, the fourth node N4 is connected to the first electrode of the sub-pixel L0 through the second luminous control transistor T4. Within a frame, for a plurality of sub-pixel rows 11 in a pixel group, a time interval between a start time that the data writing sub-circuit 1 in the pixel circuit connected to a first one of the sub-pixel rows 11 charges the second node N2 and an end time of the compensation stage t2 is greater than a charging duration that the data writing sub-circuit 1 charges the second node N2. Within a frame, for a plurality of sub-pixels rows 11 in a pixel group, a time interval between an end time that the data writing sub-circuit 1 in the pixel circuit connected to a last one of the sub-pixel rows 11 charges the second node N2 and a start time of the display stage t4 is greater than a charging duration that the data writing sub-circuit 1 charges the second node N2.

In addition, as shown in FIG. 3A, within a frame, a driving process of the pixel circuit may further include an initialization stage t1, where the initialization stage t1 is before the compensation stage t2. In the initialization stage t1, the first reset sub-circuit 3 controls the first reference voltage end Ref1 to connect to the second node N2, the second reset sub-circuit 4 controls the first initialization signal end Init1 to connect to the first node N1, the third reset sub-circuit 8 controls the second reference voltage end Ref2 to connect to the third node N3, the fourth reset sub-circuit 9 controls the second initialization signal end Init2 to connect to the first electrode of the sub-pixel L0, that is, the first reference voltage end Ref1 is connected to the second node N2 through the first reset transistor T7, the first initialization signal end Init1 is connected to the first node N1 through the second reset transistor T6, the second reference voltage end Ref2 is connected to the third node N3 through the third reset transistor T9, the second initialization signal end Init2 is connected to the first electrode of the sub-pixel L0 through the fourth reset transistor T8.

The plurality of sub-pixel rows 11 of the display apparatus may include n-th to m-th sub-pixel rows 11, where n is greater than or equal to 1, m is greater than n, m is less than or equal to a number of sub-pixel rows 11 in the display apparatus. The n-th to m-th sub-pixel rows 11 can constitute a pixel group as mentioned above. The n-th to m-th sub-pixel rows 11 can include an f-th sub-pixel row 11 and a (f+1)-th sub-pixel row 11, where f is greater than or equal to n, and (f+1) is less than or equal to m. A start time that the data writing sub-circuit 1 in the pixel circuit connected to the f-th sub-pixel row 11 charges the second node N2 is before a start time that the data writing sub-circuit 1 in the pixel circuit connected to the (f+1)-th sub-pixel row 11 charges the second node N2.

It is taken as an example that a plurality of pixel circuits correspondingly connected to a plurality of sub-pixels L0 in the n-th to m-th sub-pixel rows 11 are connected to a same first scan signal end Gate1, the compensation stage t2 of the plurality of pixel circuits correspondingly connected to the plurality of sub-pixels L0 in the n-th to m-th sub-pixel rows 11 is after a start time that the luminous control sub-circuit 5 in the pixel circuit connected to the m-th sub-pixel row 11 controls the first power end VDD to connect to the third node N3, and is before a start time that the data writing sub-circuit 1 in the pixel circuit connected to the n-th sub-pixel row 11 charges the second node N2.

Figure 3B:
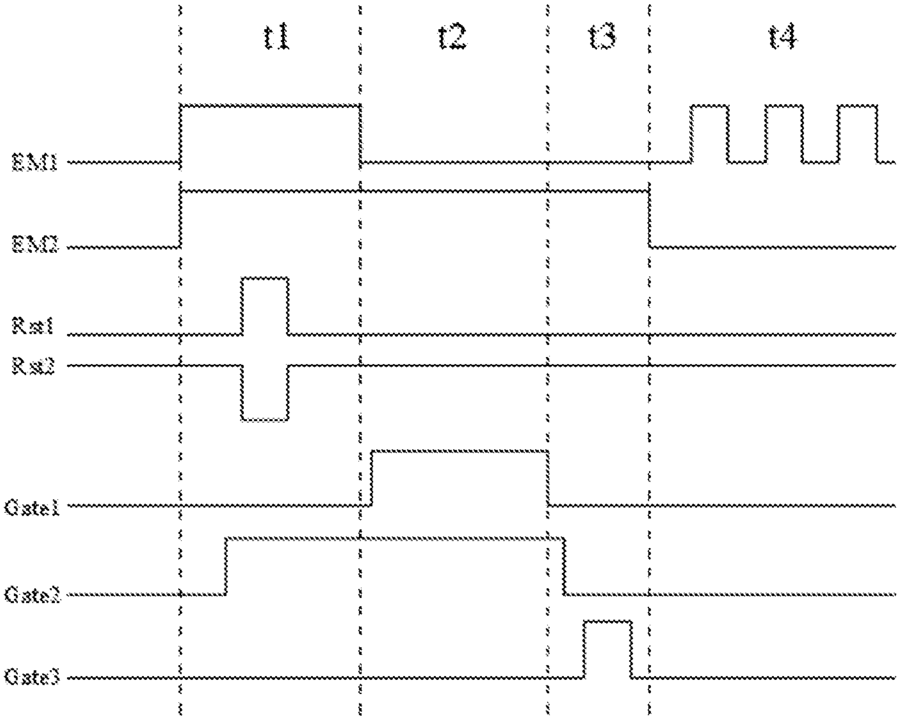
Figure 3C:
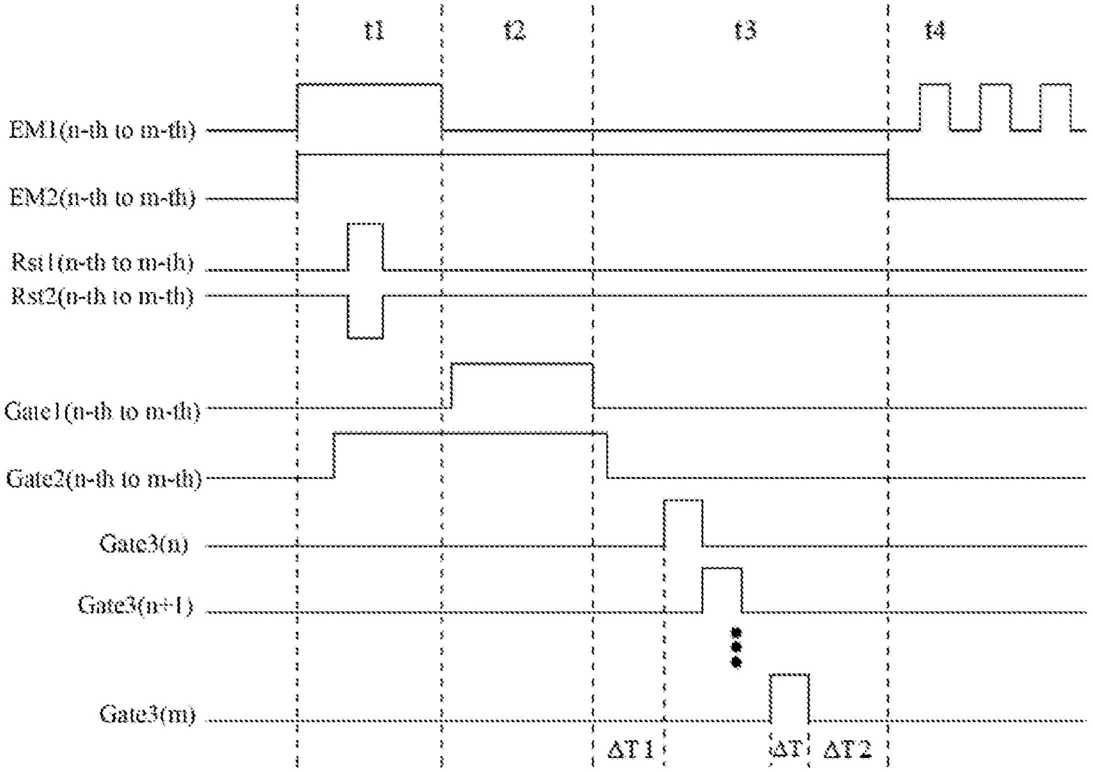

For example, in FIG. 3C, it is taken as an example that the n-th to m-th sub-pixel rows 11 constitute a pixel group, a plurality of pixel circuits correspondingly connected to a plurality of sub-pixels L0 in the n-th to m-th sub-pixel rows 11 are connected to a same first scan signal end Gate1 (n-th to m-th), the plurality of pixel circuits correspondingly connected to the plurality of sub-pixels L0 in the n-th to m-th sub-pixel rows 11 are connected to a same second scan signal end Gate2 (n-th to m-th), the plurality of pixel circuits correspondingly connected to the plurality of sub-pixels L0 in the n-th to m-th sub-pixel rows 11 are connected to a same first reset signal end Rst1 (n-th to m-th), the plurality of pixel circuits correspondingly connected to the plurality of sub-pixels L0 in the n-th to m-th sub-pixel rows 11 are connected to a same second reset signal end Rst2 (n-th to m-th), the plurality of pixel circuits correspondingly connected to the plurality of sub-pixels L0 in the n-th to m-th sub-pixel rows 11 are connected to a same first luminous control signal end EM1 (n-th to m-th), the plurality of pixel circuits correspondingly connected to the plurality of sub-pixels L0 in the n-th to m-th sub-pixel rows 11 are connected to a same second luminous control signal end EM2 (n-th to m-th); in such arrangement, wiring can be reduced, layout area of a gate driving circuit can be saved, which is equivalent to that a plurality of sub-pixel rows 11 share a same level of shift register, which is beneficial to realization of a narrow frame; at the same time, a frequency of a clock signal input to the gate driving circuit can be reduced, and a demand for a driving chip can be reduced. The driving chip is configured to provide a clock signal to the gate driving circuit. A pixel circuit connected to the n-th sub-pixel row 11 is connected to a third scan signal end Gate3(*n*), a pixel circuit connected to the (n+1)-th sub-pixel row 11 is connected to a third scan signal end Gate3(*n*+1), a pixel circuit connected to the m-th sub-pixel row 11 is connected to a third scan signal end Gate3(*m*); the compensation stage t2 of the plurality of pixel circuits correspondingly connected to the plurality of sub-pixels L0 in the n-th to m-th sub-pixel rows 11 is after a start time that the luminous control sub-circuit 5 in the pixel circuit connected to the m-th sub-pixel row 11 controls the first power end VDD to connect to the third node N3, and is before a start time that the data writing sub-circuit 1 in the pixel circuit connected to the n-th sub-pixel row 11 charges the second node N2; the display stage t4 of the plurality of pixel circuits correspondingly connected to the plurality of sub-pixels L0 in the n-th to m-th sub-pixel rows 11 is after an end time that the data writing sub-circuit 1 in the pixel circuit connected to the m-th sub-pixel row 11 charges the second node N2, that is, the n-th to m-th sub-pixel rows 11 emit light uniformly.

In addition, in FIG. 3C, a time interval ΔT1 between a start time that the data writing sub-circuit 1 in the pixel circuit connected to the n-th sub-pixel row 11 charges the second node N2 and an end time of the compensation stage t2 is greater than a charging duration ΔT that the data writing sub-circuit 1 charges the second node N2, where the charging duration ΔT is a duration that the third scan signal end Gate3 being at an effective electric level, that is, within ΔT, the third scan signal end Gate3 controls the data writing transistor T1 to turn on; within a frame, a time interval ΔT2 between an end time that the data writing sub-circuit 1 in the pixel circuit connected to the m-th sub-pixel row 11 charges the second node N2 and a start time of the display stage t4 is greater than a charging duration ΔT that the data writing sub-circuit 1 charges the second node N2; the above ΔT1 and ΔT2 may be equal, or certainly, not equal; in such arrangement, the time interval ΔT1 and the time interval ΔT12 are increased, so that a ratio of a phase difference between any two third scan signal ends Gate3 to a total duration of the data writing stage t3 is reduced, and the display is more uniform.

In the following, an operating process of the pixel circuit in FIG. 2 will be described in detail with reference to an operating timing diagram of the pixel circuit shown in FIG. 3A. The data writing transistor T1, the first reset transistor T7, the second reset transistor T6 and the compensation transistor T2 are N-type transistors, and a turn-on electric level thereof is a high electric level; the first luminous control transistor T5, the third reset transistor T9, the driving transistor T3, the second luminous control transistor T4 and the fourth reset transistor T8 are P-type transistors, and a turn-on electric level thereof is a low electric level.

As shown in FIG. 2 and FIG. 3A, in the initialization stage t1, the first luminous control signal end EM1, the second luminous control signal end EM2, the first reset signal end Rst1 and the second scan signal end Gate2 are at high electric levels, the second reset signal end Rst2, the first scan signal end Gate1 and the third scan signal end Gate3 are at low electric levels, the first reset transistor T7, the second reset transistor T6, the fourth reset transistor T8 and the third reset transistor T9 are turned on; the first reference voltage end Ref1 and the second node N2 are connected, the second node N2 is reset; the first initialization signal end Init1 is connected to the first N1, the first node N1 is reset; the second initialization signal end Init2 is connected to the first electrode of the sub-pixel L0, the first electrode of the sub-pixel L0 is reset; the second reference voltage end Ref2 is connected to the third node N3, and the third node N3 is reset. Since both the first node N1 and the second node N2 are reset to an initial voltage, the first capacitor C1 and the second capacitor C2 are also initialized.

As shown in FIG. 2 and FIG. 3A, in the compensation stage t2, the first luminous control signal end EM1 and the first reset signal end Rst1 jump to a low electric level, the first scan signal end Gate1 and the second reset signal end Rst2 jump to a high electric level, the second luminous control signal end EM2 and the second scan signal end Gate2 remain in a high electric level, the third scan signal end Gate3 remains in a low electric level; the second reset transistor T6, the fourth reset transistor T8 and the third reset transistor T9 are turned off, the first reset transistor T7 remains turned on and is configured to stabilize a voltage of the second node N2 (the voltage is written as Vref1 by the first reference voltage end Ref1); the first luminous control transistor T5 is turned on, the driving transistor T3 is turned on (in the initialization stage t1, the driving transistor T3 is turned on by setting an electric potential of the first initialization signal end Init1), the compensation transistor T2 is turned on, the first power end VDD is connected to the first node N1, and when a voltage of the first node N1 is written as [VDD+Vth(T3)], the driving transistor T3 is turned off.

As shown in FIG. 2 and FIG. 3A, in the data writing stage t3, the first scan signal end Gate1 and the second scan signal end Gate2 jump to a low electric level in turn, the third scan signal end Gate3 jump to a high electric level, the data writing transistor T1 is turned on, the data signal end DATA is connected to the second node N2, a voltage of the second node N2 is written as Vdata by the data signal end DATA, and under coupling effect of the first capacitor, a voltage of the first node N1 changes by (Vdata−Vref1)*a, where a is related to a ratio between the first capacitor C1 and the second capacitor C2, and at this time, a voltage of the first node N1 is [VDD+Vth(T3)+(Vdata−Vref1)*a]. It can be seen that the compensation stage t2 of the present disclosure is carried out separately from the data writing stage t3, and the compensation stage t2 is not influenced by a writing time of the data signal end DATA, and compensation effect can be improved by increasing a duration of the compensation stage t2.

Figure 4:
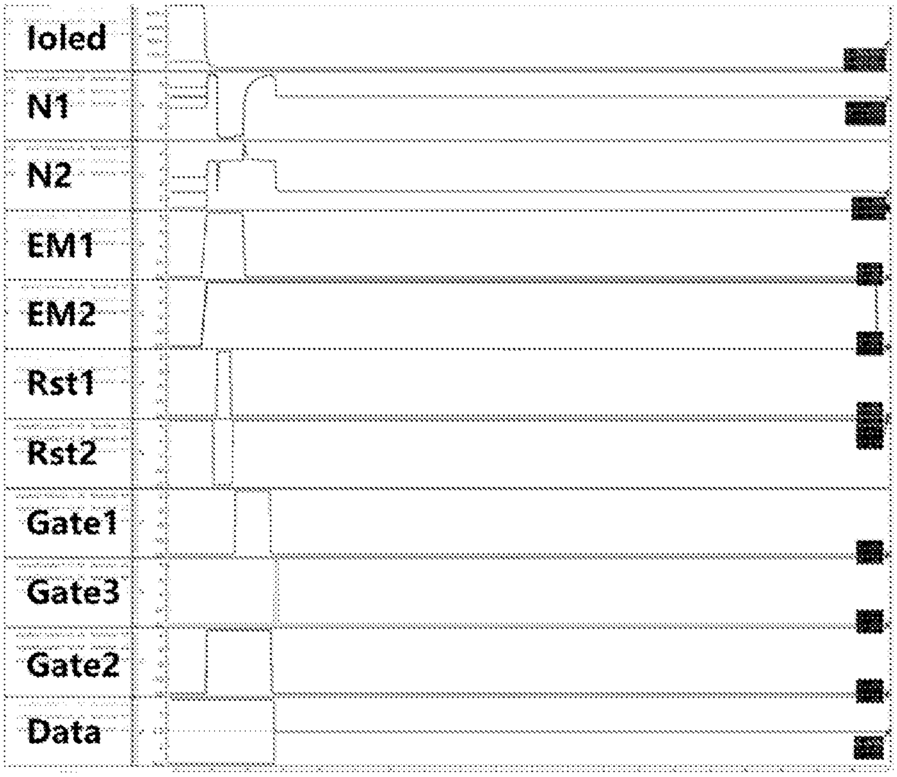
FIG. 4 is a schematic simulation diagram of a pixel circuit of an embodiment of the present disclosure.

As shown in FIG. 2 and FIG. 3A, in the display stage t4, the third scan signal end Gate3 and the second luminous control signal end EM2 jump to a low electric level, the driving transistor T3, the second luminous control transistor T4 and the first luminous control transistor T5 are turn on, and the sub-pixel L0 emits light. A luminous current formula is: I=½*μ*Cox*W/L*(Vgs−Vth)^2=½*μ*Cox*W/L*[(Vdata−Vref1)*a]^2, where p represents electron mobility, Cox represents gate oxide capacitance, Vgs represents a voltage difference between a control electrode and a first electrode of the driving transistor T3, W/L represents a ratio of width to length of a channel area of the driving transistor T3. It can be seen that the luminous formula does not contain a factor of Vth(T3), which means that the pixel circuit can compensate a threshold voltage of the driving transistor T3 to bring better display uniformity. FIG. 4 is a schematic simulation diagram of a pixel circuit.

Compared to FIG. 3A, a difference that the pixel circuit of FIG. 2 operates according to the timing diagram of FIG. 3B is that: in the display stage t4, a pulse width modulation (PWM) is adopted for light adjustment, and specifically, an emitting duration of the sub-pixel L0 is controlled through an electric potential of the first luminous control signal end EM1, and a luminance of the sub-pixel L0 can be further controlled.

Compared to FIG. 3A, a difference that the pixel circuit of FIG. 2 operates according to the timing diagram of FIG. 3B is that: in the data writing stage t3, a plurality of third scan signal ends Gate3 [Gate3(*n*), Gate3(*n*+1), . . . , Gate3(*m*)] jump to a high electric level in turn, and second nodes N2 of pixel circuits connected to different sub-pixel rows 11 are written as Vdata in turn.

An embodiment of the present disclosure further provides a driving method for a pixel circuit, configured to drive the pixel circuit in the above embodiments. The driving method for the pixel circuit includes: causing a driving sub-circuit 6 to control connection or disconnection between a third node N3 and a fourth node N4 under control of a first node N1; causing a compensation sub-circuit 2 to control connection or disconnection between the first node N1 and the fourth node N4 under control of a first scan signal end Gate1; causing a luminous control sub-circuit 5 to control connection or disconnection between a first power end VDD and the third node N3 under control of a first luminous control signal end EM1, and further causing the luminous control sub-circuit 5 to control connection or disconnection between the fourth node N4 and a first electrode of a sub-pixel L0 under control of a second luminous control signal EM2. Since the pixel circuit driven by the driving method of the embodiment of the present disclosure is same as the pixel circuit in the above-mentioned embodiments, it has same beneficial effects, which will not be repeated here.

An embodiment of the present disclosure further provides a display apparatus. The display apparatus may include the pixel circuit or the sub-pixel connected to the pixel circuit according to any one of the above embodiments. The display apparatus can be a portable phone, a smart phone, a video phone, a smart tablet, a smart watch, a tablet personal computer, a navigation system for vehicles, a television, a computer monitor, a notebook computer, a head-mounted display and any other products or components with display functions. Since the pixel circuit in the display apparatus of the embodiment of the present disclosure is same as the pixel circuit in the above-mentioned embodiments, it has same beneficial effects, which will not be repeated here.

The above are only preferred embodiments of the present disclosure, and they do not limit the present disclosure in any form. Although the present disclosure has been disclosed in the preferred embodiments, they are not used to limit the present disclosure. Any person familiar with this profession can make some changes or modify it into an equivalent embodiment by using the technical content disclosed above without departing from the scope of the technical solution of the present disclosure. So long as the content does not depart from the technical solution of the present disclosure, any simple modifications, equivalent changes or modifications made to the above embodiments according to the technical essence of the present disclosure belong to the scope of the technical solution of the present disclosure.

The invention claimed is:

1. A pixel circuit, comprising:

a first storage sub-circuit, connected between a first node and a second node;

a data writing sub-circuit, connected to the second node, wherein the data writing sub-circuit is configured to charge the second node;

a driving sub-circuit, connected to the first node, a third node and a fourth node, wherein the driving sub-circuit is configured to control connection or disconnection between the third node and the fourth node under control of the first node;

a compensation sub-circuit, connected to a first scan signal end, the first node and the fourth node, wherein the compensation sub-circuit is configured to control connection or disconnection between the first node and the fourth node under control of the first scan signal end; and a luminous control sub-circuit, connected to a first power end, a first luminous control signal end, the third node, the fourth node, a second luminous control signal end and a first electrode of a sub-pixel, wherein the luminous control sub-circuit is configured to control connection or disconnection between the first power end and the third node under control of the first luminous control signal end, and is configured to control connection or disconnection between the fourth node and the first electrode of the sub-pixel under control of the second luminous control signal end, wherein the pixel circuit further comprises: a first reset sub-circuit, connected to a second scan signal end, a first reference voltage end and the second node, wherein the first reset sub-circuit is configured to control connection or disconnection between the first reference voltage end and the second node under control of the second scan signal end, and wherein within a frame, a start time that the first reset sub-circuit controls the first reference voltage end to connect to the second node is before a start time that the compensation sub-circuit controls the first node to connect to the fourth node.

2. The pixel circuit according to claim 1, wherein the first reset sub-circuit comprises:

a first reset transistor, wherein a control electrode of the first reset transistor is connected to the second scan signal end, a first electrode of the first reset transistor is connected to the first reference voltage end, and a second electrode of the first reset transistor is connected to the second node.

3. The pixel circuit according to claim 1, wherein the pixel circuit further comprises at least one of:

a second reset sub-circuit, connected to a first reset signal end, a first initialization signal end and the first node, wherein the second reset sub-circuit is configured to control connection or disconnection between the first initialization signal end and the first node under control of the first reset signal end; or a third reset sub-circuit, connected to a second reset signal end, a second reference voltage end and the third node, wherein the third reset sub-circuit is configured to control connection or disconnection between the second reference voltage end and the third node under control of the second reset signal end.

4. The pixel circuit according to claim 3, wherein the second reset sub-circuit comprises:

a second reset transistor, wherein a control electrode of the second reset transistor is connected to the first reset signal end, a first electrode of the second reset transistor is connected to the first initialization signal end, and a second electrode of the second reset transistor is connected to the first node; and the third reset sub-circuit comprises:

a third reset transistor, wherein a control electrode of the third reset transistor is connected to the second reset signal end, a first electrode of the third reset transistor is connected to the second reference voltage end, and a second electrode of the third reset transistor is connected to the third node.

5. The pixel circuit according to claim 1, wherein the pixel circuit further comprises:

a fourth reset sub-circuit, connected to a second reset signal end, a second initialization signal end and the first electrode of the sub-pixel, wherein the fourth reset sub-circuit is configured to control connection or disconnection between the second initialization signal end and the first electrode of the sub-pixel under control of the second reset signal end; and the fourth reset sub-circuit comprises:

a fourth reset transistor, wherein a control electrode of the fourth reset transistor is connected to the second reset signal end, a first electrode of the fourth reset transistor is connected to the second initialization signal end, and a second electrode of the fourth reset transistor is connected to the first electrode of the sub-pixel.

6. The pixel circuit according to claim 5, wherein the data writing sub-circuit comprises:

a data writing transistor, wherein a control electrode of the data writing transistor is connected to a third scan signal end, a first electrode of the data writing transistor is connected to a data signal end, and a second electrode of the data writing transistor is connected to the second node.

7. The pixel circuit according to claim 6, wherein the driving sub-circuit comprises:

a driving transistor, wherein a control electrode of the driving transistor is connected to the first node, a first electrode of the driving transistor is connected to the third node, and a second electrode of the driving transistor is connected to the fourth node; and the compensation sub-circuit comprises:

a compensation transistor, wherein a control electrode of the compensation transistor is connected to the first scan signal end, a first electrode of the compensation transistor is connected to the fourth node, and a second electrode of the compensation transistor is connected to the first node.

8. The pixel circuit according to claim 7, wherein the luminous control sub-circuit comprises:

a first luminous control transistor, wherein a control electrode of the first luminous control transistor is connected to the first luminous control signal end, a first electrode of the first luminous control transistor is connected to the first power end, and a second electrode of the first luminous control transistor is connected to the third node;

a second luminous control transistor, wherein a control electrode of the second luminous control transistor is connected to the second luminous control signal end, a first electrode of the second luminous control transistor is connected to the fourth node, and a second electrode of the second luminous control transistor is connected to the first electrode of the sub-pixel.

9. The pixel circuit according to claim 8, wherein the data writing transistor, the first reset transistor, the second reset transistor and the compensation transistor are oxide thin-film transistors; the first luminous control transistor, the third reset transistor, the driving transistor, the second luminous control transistor and the fourth reset transistor are low-temperature polysilicon thin-film transistors.

10. The pixel circuit according to claim 3, wherein the pixel circuit is applied to a display apparatus, the display apparatus comprises a plurality of sub-pixels arranged in an array, the plurality of sub-pixels constitute a plurality of sub-pixel rows, the plurality of sub-pixel rows constitute one or more pixel groups, and each of the one or more pixel groups comprises multiple sub-pixel rows;

pixel circuits correspondingly connected to sub-pixels in a pixel group are connected to a same first scan signal end; and/or pixel circuits correspondingly connected to sub-pixels in a pixel group are connected to a same second scan signal end; and/or pixel circuits correspondingly connected to sub-pixels in a pixel group are connected to a same first reset signal end; and/or pixel circuits correspondingly connected to sub-pixels in a pixel group are connected to a same second reset signal end; and/or pixel circuits correspondingly connected to sub-pixels in a pixel group are connected to a same first luminous control signal end; and/or pixel circuits correspondingly connected to sub-pixels in a pixel group are connected to a same second luminous control signal end.

11. The pixel circuit according to claim 10, wherein within a frame, a driving process of the pixel circuit comprises a compensation stage, a data writing stage and a display stage, wherein the compensation stage is before the data writing stage, and the display stage is after the data writing stage;

within a frame, for sub-pixel rows in a pixel group, a time interval between a start time that the data writing sub-circuit in the pixel circuit connected to a first one of the sub-pixel rows charges the second node and an end time of the compensation stage is greater than a charging duration that the data writing sub-circuit charges the second node; and/or, within a frame, for sub-pixels rows in a pixel group, a time interval between an end time that the data writing sub-circuit in the pixel circuit connected to a last one of the sub-pixel rows charges the second node and a start time of the display stage is greater than a charging duration that the data writing sub-circuit charges the second node.

12. A display apparatus, comprising a pixel circuit and a sub-pixel connected to the pixel circuit, wherein the pixel circuit comprises:

a first storage sub-circuit, connected between a first node and a second node;

a data writing sub-circuit, connected to the second node, wherein the data writing sub-circuit is configured to charge the second node;

a driving sub-circuit, connected to the first node, a third node and a fourth node, wherein the driving sub-circuit is configured to control connection or disconnection between the third node and the fourth node under control of the first node;

a compensation sub-circuit, connected to a first scan signal end, the first node and the fourth node, wherein the compensation sub-circuit is configured to control connection or disconnection between the first node and the fourth node under control of the first scan signal end; and a luminous control sub-circuit, connected to a first power end, a first luminous control signal end, the third node, the fourth node, a second luminous control signal end and a first electrode of the sub-pixel, wherein the luminous control sub-circuit is configured to control connection or disconnection between the first power end and the third node under control of the first luminous control signal end, and is configured to control connection or disconnection between the fourth node and the first electrode of the sub-pixel under control of the second luminous control signal end, wherein the pixel circuit further comprises: a first reset sub-circuit, connected to a second scan signal end, a first reference voltage end and the second node, wherein the first reset sub-circuit is configured to control connection or disconnection between the first reference voltage end and the second node under control of the second scan signal end; and wherein within a frame, a start time that the first reset sub-circuit controls the first reference voltage end to connect to the second node is before a start time that the compensation sub-circuit controls the first node to connect to the fourth node.

13. The pixel circuit according to claim 2, wherein within a frame, a start time that the first reset sub-circuit controls the first reference voltage end to connect to the second node is before a start time that the compensation sub-circuit controls the first node to connect to the fourth node.

14. The pixel circuit according to claim 2, wherein the pixel circuit further comprises at least one of:

a second reset sub-circuit, connected to a first reset signal end, a first initialization signal end and the first node, wherein the second reset sub-circuit is configured to control connection or disconnection between the first initialization signal end and the first node under control of the first reset signal end; or a third reset sub-circuit, connected to a second reset signal end, a second reference voltage end and the third node, wherein the third reset sub-circuit is configured to control connection or disconnection between the second reference voltage end and the third node under control of the second reset signal end.

15. The pixel circuit according to claim 4, wherein the pixel circuit further comprises:

a fourth reset sub-circuit, connected to a second reset signal end, a second initialization signal end and the first electrode of the sub-pixel, wherein the fourth reset sub-circuit is configured to control connection or disconnection between the second initialization signal end and the first electrode of the sub-pixel under control of the second reset signal end; and the fourth reset sub-circuit comprises:

a fourth reset transistor, wherein a control electrode of the fourth reset transistor is connected to the second reset signal end, a first electrode of the fourth reset transistor is connected to the second initialization signal end, and a second electrode of the fourth reset transistor is connected to the first electrode of the sub-pixel.

* * * * *